United States Patent
Shen et al.

(10) Patent No.: US 11,392,426 B2
(45) Date of Patent: Jul. 19, 2022

(54) MULTITASK PARALLEL PROCESSING METHOD AND APPARATUS, COMPUTER DEVICE AND STORAGE MEDIUM

(71) Applicant: LYNXI TECHNOLOGIES CO., LTD., Beijing (CN)

(72) Inventors: Yangshu Shen, Beijing (CN); Yaolong Zhu, Beijing (CN); Wei He, Beijing (CN); Luping Shi, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/434,736

(22) PCT Filed: Dec. 21, 2020

(86) PCT No.: PCT/CN2020/137972
§ 371 (c)(1),
(2) Date: Aug. 28, 2021

(87) PCT Pub. No.: WO2022/027902
PCT Pub. Date: Feb. 10, 2022

(65) Prior Publication Data
US 2022/0091906 A1    Mar. 24, 2022

(51) Int. Cl.
G06F 9/46 (2006.01)
G06F 9/52 (2006.01)
G06N 3/04 (2006.01)

(52) U.S. Cl.
CPC .............. *G06F 9/52* (2013.01); *G06N 3/04* (2013.01)

(58) Field of Classification Search
CPC ..................................... G06F 9/52; G06N 3/04
See application file for complete search history.

(56) References Cited

U.S. PATENT DOCUMENTS

| 10,198,838 B2 | 2/2019 | Kumar et al. |
| 10,379,906 B2 | 8/2019 | Qi et al. |
| 2015/0339129 A1 | 11/2015 | Divakaran et al. |

FOREIGN PATENT DOCUMENTS

| CN | 101183368 A | 5/2008 |
| CN | 104598600 A | 5/2015 |
| CN | 105874426 A | 8/2016 |
| CN | 106650925 A | 5/2017 |
| CN | 106951960 A | 7/2017 |
| CN | 108885779 A | 11/2018 |
| CN | 109886407 A | 6/2019 |

(Continued)

OTHER PUBLICATIONS

WIPO, International Search Report dated Apr. 9, 2021.

(Continued)

*Primary Examiner* — Gregory A Kessler
(74) *Attorney, Agent, or Firm* — Li & Cai Intellectual Property (USA) Office (57) ABSTRACT

Embodiments of the present disclosure provide multitask parallel processing method and apparatus, a computer device and a storage medium. The method is applied to a neural network consisting of a plurality of nodes, the neural network including at least one closed-loop path, and the method includes: inputting a data sequence to be computed into the neural network in a form of data packets, each of the data packets including multiple pieces of data; and computing, by the nodes in the closed-loop path, all the data in a currently received data packet each time a computation flow is started.

16 Claims, 6 Drawing Sheets

(56) References Cited

FOREIGN PATENT DOCUMENTS

| CN | 110390385 | A | 10/2019 |
| CN | 111027688 | A | 4/2020 |
| CN | 111736904 | A | 10/2020 |
| EP | 3196809 | A1 | 7/2017 |

OTHER PUBLICATIONS

Zhu, Hu-Ming, et al. "Review of Parallel Deep Neural Network," Chinese Journal of Computers, vol. 41, No. 8, Aug. 2018.
Andreas K. Fidjeland and Murray P. Shanahan. "Accelerated Simulation of Spiking Neural Networks Using GPUs," issued on Dec. 31, 2018.
CN202010764840.0 First Office Action dated Oct. 16, 2020.
CN202010764840.0 Second Office Action dated Oct. 29, 2020.

MULTITASK PARALLEL PROCESSING METHOD AND APPARATUS, COMPUTER DEVICE AND STORAGE MEDIUM

CROSS-REFERENCE TO RELATED APPLICATIONS

The present application is a National Phase Application filed under 35 U.S.C. 371 as a national stage of PCT/CN2020/137972, filed on Dec. 21, 2020, an application claiming priority from Chinese Patent Application No. 202010764840.0, filed on Aug. 3, 2020 in the Chinese Intellectual Property Office and titled "MULTITASK PARALLEL PROCESSING METHOD AND APPARATUS, COMPUTER DEVICE AND STORAGE MEDIUM", the content of which is hereby incorporated herein by reference in its entirety.

TECHNICAL FIELD

Embodiments of the disclosure relate to artificial intelligence technologies, and particularly relate to a multitask parallel processing method and apparatus, a computer device and a storage medium.

BACKGROUND

The neural network is an algorithm mathematical model that imitates animal neural network behavior characteristics to carry out distributed parallel information processing. A neural network mainly consists of a plurality of nodes combined in a set connection manner, in which each node can receive and process data from a previous node and transmit a processing result to a next node.

In the related art, when a closed-loop path is included in the neural network, some nodes in the neural network need to perform joint computation by using input data and data fed back by the closed-loop path. For example, the neural network shown in FIG. 1A includes a closed-loop path formed by nodes B, C, D and E. Data are input into the neural network in an order of x0, x1, x2, x3 and x4, where x0 is processed at node A to obtain a0, a0 is processed at node B to obtain b0, b0 is processed at node C to obtain c0, c0 is processed at node D to obtain d0, and d0 is processed at node E to obtain e0. Each node processes the input data in a time slice.

Figure 1A:
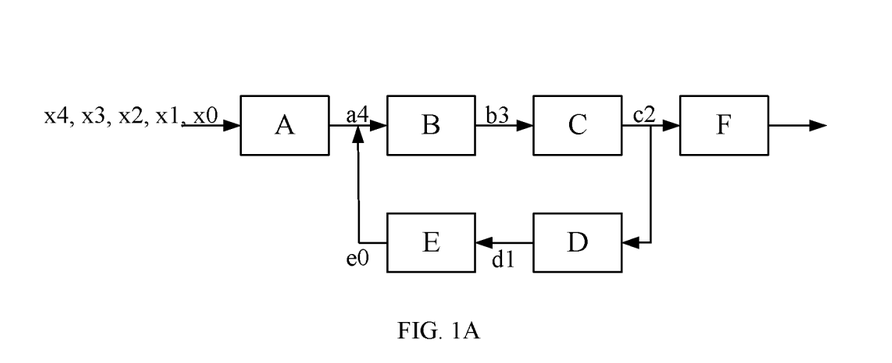
FIG. 1A is a schematic structural diagram of a neural network including a closed-loop path according to the related art.

At node B, after a0, a1, a2 and a3, which are processed by node A and transmitted in sequence, are processed in different time slices, a4, which is also input from node A, and e0, a processing result of x0 at node E, are required to be used for the joint computation.

In the process of implementing the present disclosure, the inventor finds that the related art has the following defects: the closed-loop path includes nodes depending on subsequent computation results, so a single-task computation mode is adopted in data computation by the closed-loop path, which causes low processing efficiency at each node, and thus prolonged data processing of the whole neural network.

SUMMARY

Embodiments of the present disclosure provide a multitask parallel processing method and apparatus, a computer device and a storage medium that can improve the processing efficiency at nodes in a closed-loop path of a neural network.

In a first aspect, an embodiment of the present disclosure provides a multitask parallel processing method applied to a neural network consisting of a plurality of nodes, the neural network including at least one closed-loop path, and the method including: inputting a data sequence to be computed into the neural network in a form of data packets, each of the data packets including multiple pieces of data; and computing, by the nodes in the closed-loop path, all the data in a currently received data packet each time a computation flow is started.

In a second aspect, an embodiment of the present disclosure further provides a multitask parallel processing apparatus applied to a neural network consisting of a plurality of nodes, the neural network including at least one closed-loop path, and the multitask parallel processing apparatus including: a data input module configured to input a data sequence to be computed into the neural network in a form of data packets, each of the data packets including multiple pieces of data; and a data computation module configured to compute, by the nodes in the closed-loop path, all the data in a currently received data packet each time a computation flow is started.

In a third aspect, an embodiment of the present disclosure further provides a computer device, including: one or more processors; and a memory device configured to store one or more programs which, when executed by the one or more processors, cause the one or more processors to implement the multitask parallel processing method according to any of the embodiments of the present disclosure.

In a fourth aspect, an embodiment of the present disclosure further provides a computer readable storage medium having a computer program stored thereon which, when executed by a processor, causes the multitask parallel processing method according to any of the embodiments of the present disclosure to be implemented.

According to the technical solution provided in the embodiments of the present disclosure, a parallel task processing mechanism is introduced into the neural network including at least one closed-loop path, and by inputting the data sequence to be computed into the neural network in the form of data packets, the nodes included in the closed-loop path can compute all the data in the currently received data packet each time a computation flow is started, thereby avoiding the problems of low processing efficiency at the nodes, and prolonged data processing of the whole neural network when a single-task computation mode is adopted for the closed-loop path in the neural in the related art, and improving the processing efficiency at the nodes in the closed-loop path of the neural network as well as the operation speed of the neural network.

DETAILED DESCRIPTION

The present disclosure will now be further described in detail below in conjunction with the drawings and exemplary embodiments. It will be appreciated that the specific embodiments described here are used only for the purpose of explaining the disclosure instead of limiting the disclosure. It should be further noted that, for the convenience of description, only some portions related to the present disclosure, but not the entire structure, are shown in the drawings.

It should be further noted that, for the convenience of description, only some portions related to the present disclosure, but not the entire contents, are shown in the drawings. Before discussing the exemplary embodiments in greater detail, it should be noted that some exemplary embodiments are described as processes or methods depicted as flowcharts. Although a flowchart may describe operations (or steps) as a sequential process, many of the operations can be performed in parallel, concurrently, or simultaneously. In addition, the order of the operations may be rearranged. The process may be terminated when its operations are completed, but could have additional steps not included in the drawings. The processes may correspond to methods, functions, procedures, subroutines, subprograms, and the like.

Embodiment I

Figure 1B:
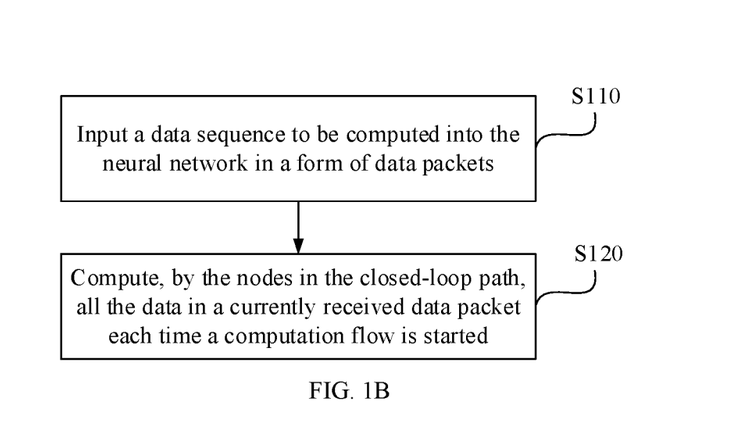
FIG. 1B is a flowchart illustrating an implementation of a multitask parallel processing method according to Embodiment I of the present disclosure.

FIG. 1B is a flowchart illustrating an implementation of a multitask parallel processing method according to Embodiment I of the present disclosure. This embodiment is applicable to a case where multitask computation is performed by a plurality of nodes in a neural network including at least one closed-loop path. The method may be implemented by a multitask parallel processing apparatus which may be implemented by software and/or hardware, and which may be generally integrated in various computer devices (for example, desktop computers, servers, or laptops, etc.) capable of operating the neural network. Specifically, the method provided in the embodiment of the disclosure includes the following steps S110 to S120.

At step S110, a data sequence to be computed is input into the neural network in a form of data packets, each of the data packets including multiple pieces of data.

The neural network consisting of a plurality of nodes, can realize network architecture with set complex functions. The neural network includes one or more closed-loop paths as shown in FIG. 1A. In a closed-loop path, i.e., a feedback network, one or more preorder nodes (e.g., node B in FIG. 1A) in the network receives feedback input from one or more subsequent nodes (e.g., node E in FIG. 1A).

The nodes in the neural network are configured to perform linear or nonlinear operation on the input data according to a set computation strategy and then output an operation result. At each node, whenever input data is received, the node needs to make computation preparations first, and after the preparations are done, compute the input data according to a preset computation strategy, before finally outputting the computation result data.

The input data received by a node may be data directly input into the neural network, or computation result data propagated downwards from a node of a previous stage (a preorder node), or may be computation result data fed back forwards from a node of a next stage (a postorder node). The computation result data obtained from the computation by a node may be directly output to the outside of the neural network, or may be output to a node of a previous stage, or may also be output to a node of a next stage.

In the related art, since the neural network including a closed-loop path has nodes depending on subsequent computation results, the type of neural networks as described above performs data computation in a single-task mode. That is, each piece of task data (i.e., each piece of data in the data sequence) is successively and sequentially input to each node in the closed-loop path of the neural network, where each node processes the input data in a time slice and outputs the processing result. Specifically, the time slice refers to the time required for a node to compute a piece of data. Each node needs to make computation preparations before computing the input data, and a long period of time is required from start to end of the computation preparations. Therefore, the single-task mode as discussed above involves low computation efficiency.

Unlike the single-task computation mode of the related art, in this embodiment, a data sequence to be computed is input into the neural network in the form of data packets. Each data packet includes at least two data tasks of the data sequence, so that the neural network adopts a multi-task computation mode to implement processing of all the data tasks of the data sequence.

In this embodiment, the data sequence to be computed refers to a data set that needs to be sequentially input into the neural network for computation. For example, a data sequence such as {x0, x1, . . . , xn} is input into the neural network in the order of x0, x1 . . . , xn, and after the entire data sequence is input, a computation result of the data sequence is correspondingly acquired at an output end of the neural network.

In a specific example, if the data sequence is {1.2, 2.56, 36.25, 0, −5.78, 20.14, 5.01, 63, −5.2, 3.21} and each data packet includes five data tasks, then {1.2, 2.56, 36.25, 0, −5.78} and {20.14, 5.01, 63, −5.2, 3.21} in the data sequence may respectively form a set of data, and {1.2, 2.56, 36.25, 0, −5.78} and {20.14, 5.01, 63, −5.2, 3.21} are respectively input into the neural network with the data packet as a unit.

At step S120, computing, by the nodes in the closed-loop path, all the data in a currently received data packet each time a computation flow is started.

In this embodiment, the nodes in the closed-loop path computes all the data in the received data packet each time a computation flow is started, so there is no need to start a computation flow each time a piece of data is received, which substantially reduces the starting times of the computation flow and thus reduces the total times of computation preparations. As a result, the preparation time consumed in the computation preparation process is reduced, and the computation parallelism of the whole neural network is greatly improved.

Thereby, the data packet processed at each node may be a data packet directly input into the neural network, or a data packet obtained from a data packet received and processed at a node of a previous stage (a preorder node).

According to the technical solution provided in the embodiments of the present disclosure, a parallel task processing mechanism is introduced into the neural network including at least one closed-loop path, and by inputting the data sequence to be computed into the neural network in the form of data packets, the nodes included in the closed-loop path can compute all the data in the currently received data packet each time a computation flow is started, thereby avoiding the problems of low processing efficiency at each node, and prolonged data processing of the whole neural network when a single-task computation mode is adopted for the closed-loop path in the neural network in the related art, and improving the processing efficiency at each node in the closed-loop path of the neural network as well as the operation speed of the neural network.

On the basis of the above embodiments, before inputting the data sequence to be computed into the neural network in the form of data packets, the method may further include: determining the number of parallel tasks in the closed-loop path; and accordingly, the step of inputting the data sequence to be computed into the neural network in the form of data packets may include: inputting the data sequence to be computed into the neural network in the form of data packets according to the number of parallel tasks, where the number of data pieces in the data packet is the same as the number of parallel tasks.

The number of parallel tasks refers to the number of data pieces included in each data packet, i.e., the number of tasks for parallel processing at each node in the closed-loop path.

Theoretically, the starting times of the computation flow, and thus the time consumed by starting the computation flow, may be reduced as long as the number of data tasks included in a data packet is greater than or equal to 2. Therefore, the number of parallel tasks (that is, the number of data pieces in each data packet) may be selected to be any value greater than or equal to 2. However, in order to further optimize the computation complexity and computation efficiency of each time of computation, the number of parallel tasks may be determined further according to the number of nodes included in each closed-loop path of the neural network.

Specifically, the inventor has learned through creative analysis that: if a reasonable number of parallel tasks can be determined, multitask parallel processing can be performed in the neural network including the closed-loop path as described above. After each time of computation preparations at each node, multiple parallel tasks may be processed on the premise of optimal computation complexity so that the processing efficiency of the neural network can be greatly improved, and the computation time is saved.

In the related art, a multitask mode cannot be directly applied to the neural network including a closed-loop path, because if the an inappropriate number of parallel tasks (the number of tasks processed at the same time) is selected for the multitask mode, an error will occur in the whole computation flow, and thus affect the computation accuracy of the whole neural network.

In a specific example, as shown in FIG. 1A, at node B, a4 input from node A, and e0, the processing result of data x0 input into the neural network at node E, are required to be used for joint computation. Therefore, if the number of parallel tasks is greater than or equal to 5, the computation of the closed-loop path will be misaligned, causing computation errors. That is, the number of parallel tasks is closely related to the number of nodes included in the closed-loop path of the neural network.

Therefore, if the number of parallel tasks is designed without considering the number of nodes included in the closed-loop path, an anti-misalignment processing mechanism is required at each node to ensure the accuracy of computation, which will increase the computation amount of each node in the closed-loop path and consume some computation time. Therefore, in actual designs, an effective number of parallel tasks may be selected further according to the number of nodes included in the closed-loop path of the neural network so that the situation where the data to be computed jointly with feedback data cannot acquire a corresponding feedback data is fundamentally avoided, no additional anti-misalignment processing mechanism is needed, and the computation complexity of each node is reduced.

Therefore, in an optional implementation of the embodiment, the number of parallel tasks matched with the neural network may be determined according to the number of nodes included in closed-loop paths of the neural network.

Optionally, in an optional implementation of the embodiment, the data sequence to be computed may be input into the neural network in the form of data packets by: dividing the data sequence to be computed into a plurality of data packets according to the number of parallel tasks, and inputting each data packet into the neural network; or, acquiring, each time a data input condition is satisfied, multiple pieces of data matched with the number of parallel tasks from the data sequence to be computed to form a data packet, and inputting the data packet into the neural network.

That is, after the number of parallel tasks is determined, the data sequence to be computed may be first pre-divided (obviously in sequence) into a plurality of data packets according to the number of parallel tasks, and then each data packet is sequentially input into the neural network; or each time data is required to be input into the neural network (each time a data input condition is satisfied), and multiple pieces of data matched with (e.g., equal to) the number of parallel tasks are sequentially selected from the data sequence to be computed in real time to form a data packet that is input into the neural network.

Specifically, the data input condition may include: when it is determined that a previous data packet has been successfully input into the neural network (for example, when a successful input response message fed back by the neural network is received), or when it is detected that a preset timing duration is reached, for example, when the input duration of each data packet is determined to be 1 second (s), that is, a data packet is input to the neural network every 1 s, and then, each time the timing duration of 1s is reached, multiple pieces of data matched with the number of parallel tasks may be acquired from the data sequence to be computed to form a data packet that is input into the neural network.

With this arrangement, the dividing mode and dividing timing of the data packets can be flexibly determined, and different dividing modes of the data packets and modes of inputting the data packets into the neural network are determined in different application scenarios.

On the basis of the above embodiments, the step of computing, by the nodes in the closed-loop path, all the data in a currently received data packet each time a computation flow is started may include: starting, by the nodes in the closed-loop path, a computation flow upon reception of a complete data packet, and computing all the data in the currently received data packet; and recombining, by the nodes in the closed-loop path, the computed data in the form of data packets for output after determining that computation of all data in the currently received data packet is completed.

In this optional embodiment, each time a computation flow is started, each node in the closed-loop path computes all data in the received data packet at a time so that there is no need to start a computation flow each time a piece of data is received, which substantially reduces the starting times of the computation flow and thus the total times of computation preparations. As a result, the preparation time consumed in the computation preparation process is reduced, and the computation parallelism of the whole neural network is greatly improved.

Figure 1C:
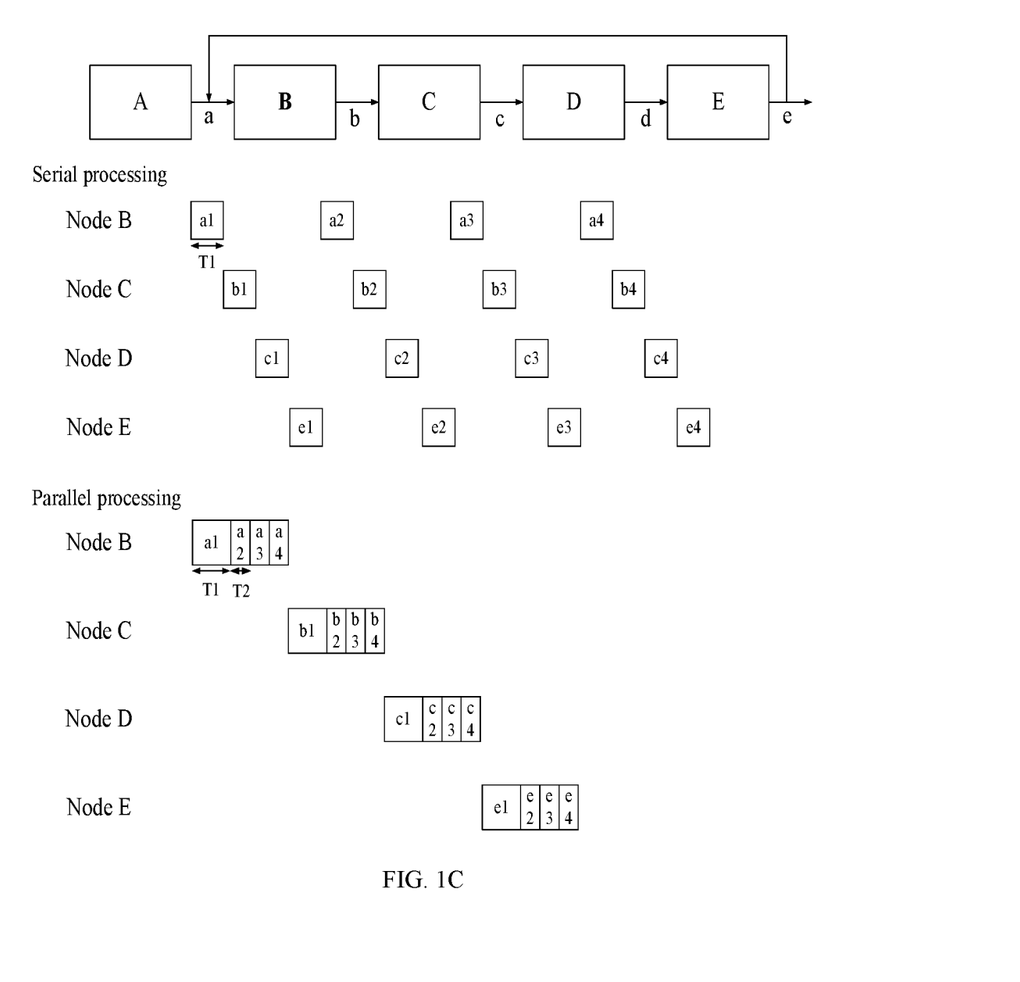
FIG. 1C is a schematic diagram illustrating a comparison of a serial task processing mode and a parallel task processing mode applied in an embodiment of the present disclosure.

FIG. 1C shows a schematic diagram illustrating a comparison of a serial task processing mode and a parallel task processing mode applied in an embodiment of the present disclosure. As shown in FIG. 1C, when data is input into a closed-loop path of the neural network in a serial manner, each node needs to make computation preparations for each piece of input data before computing the data, and then outputs the corresponding computation result, where a computation time duration required for each data is T1.

In contrast, according to the technical solution provided in the embodiments of the present disclosure, each node makes computation preparations for multiple pieces of data in the data packet at a time before computing the multiple pieces of input data at a time, and then outputs a plurality of computation results accordingly. It is obvious that, when multiple pieces of data are computed, only the first data takes a computation time duration (T1) as long as the serial processing since it requires computation preparations, after which the computation time duration (T2) for each data is much shorter than that of the first data, that is, T2 is much shorter than T1. Taking node B as an example, when processing a1 to a4 in a serial manner by using the solution in the related art, node B needs a time duration of 4*T1. When processing a1 to a4 in a parallel manner at a time by using the technical solution provided in the embodiments of the present disclosure, however, node B needs a time duration of T1+3*T2. Thereby, by using the technical solution provided in the embodiments of the present disclosure, the starting times of the computation flow at each compute node is greatly reduced, and thus the computation efficiency at each node is effectively improved, and the time consumed by the whole computation process is shortened.

In another optional implementation of the embodiment, the step of computing, by the nodes in the closed-loop path, all the data in the currently received data packet each time a computation flow is started may further include: starting, by the nodes in the closed-loop path, a computation flow upon reception of a first piece of data in a data packet, and computing the respective pieces of data in the data packet that are received successively; and outputting, by the nodes in the closed-loop path, the computed data each time at least one piece of data in the data packet is computed, where the computed at least one piece of data includes a number of data pieces less than that in the data packet.

As can be seen from FIG. 1C, when a computation flow is started at each node in the closed-loop path, processing of the first data task consumes the maximum computation time, Therefore, after each node completes the computation of one or more pieces of data (but not all data in the data packet), the one or more pieces of data may be firstly transmitted to the next node so that the next node starts the computation flow as soon as possible. Since the computation flow takes more time to be started but less time for computation after being started, when the next node starts the computation flow and completes computation of the first piece of data, subsequent pieces of data have already been input into the node successively. Thus, with the above arrangement, the time consumed by each node for computing all data tasks in the data packet is further reduced.

Figure 1D:
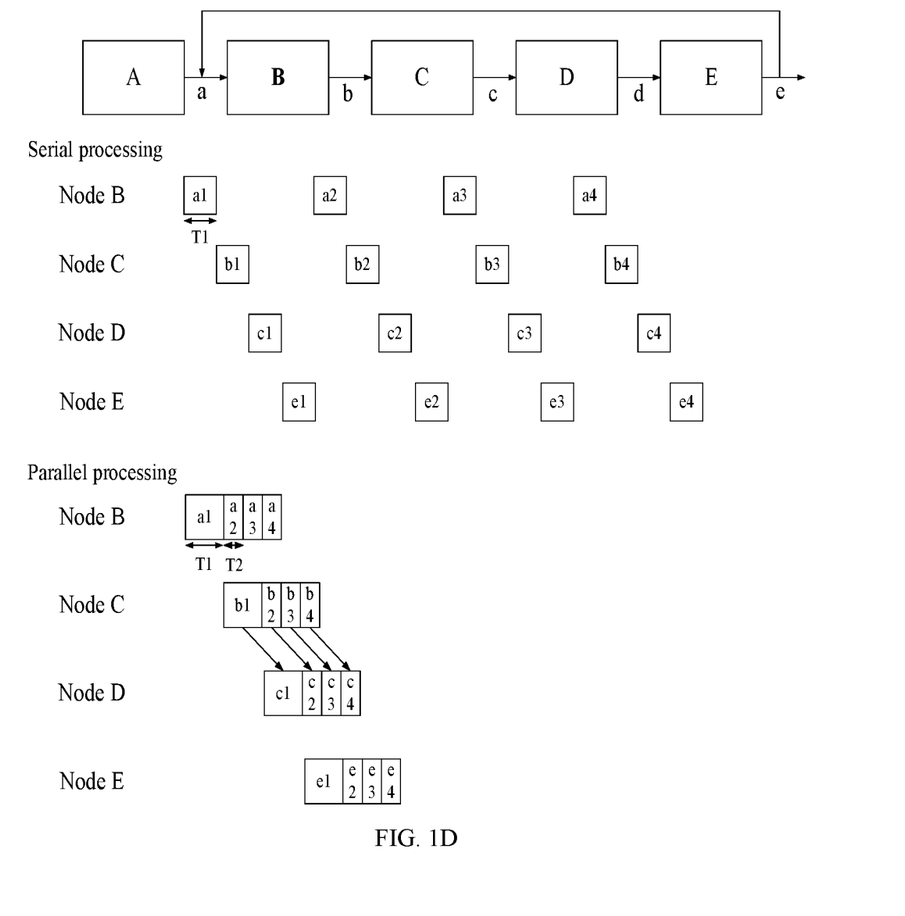
FIG. 1D is a schematic diagram illustrating another comparison of a serial task processing mode and a parallel task processing mode applied in an embodiment of the present disclosure.

FIG. 1D shows a schematic diagram illustrating another comparison of a serial task processing mode and a parallel task processing mode applied in an embodiment of the present disclosure. Taking nodes C and D in FIG. 1D as an example, when node C completes the processing of data b1 after time T1, instead of waiting for the completion of processing of data b2 to b4, the corresponding data c1 is directly input into node D so that node D starts the computation flow in the shortest time, after which c2 to c4 sent from node C successively are processed to further increase the processing speed at each node.

Embodiment II

Figure 2:
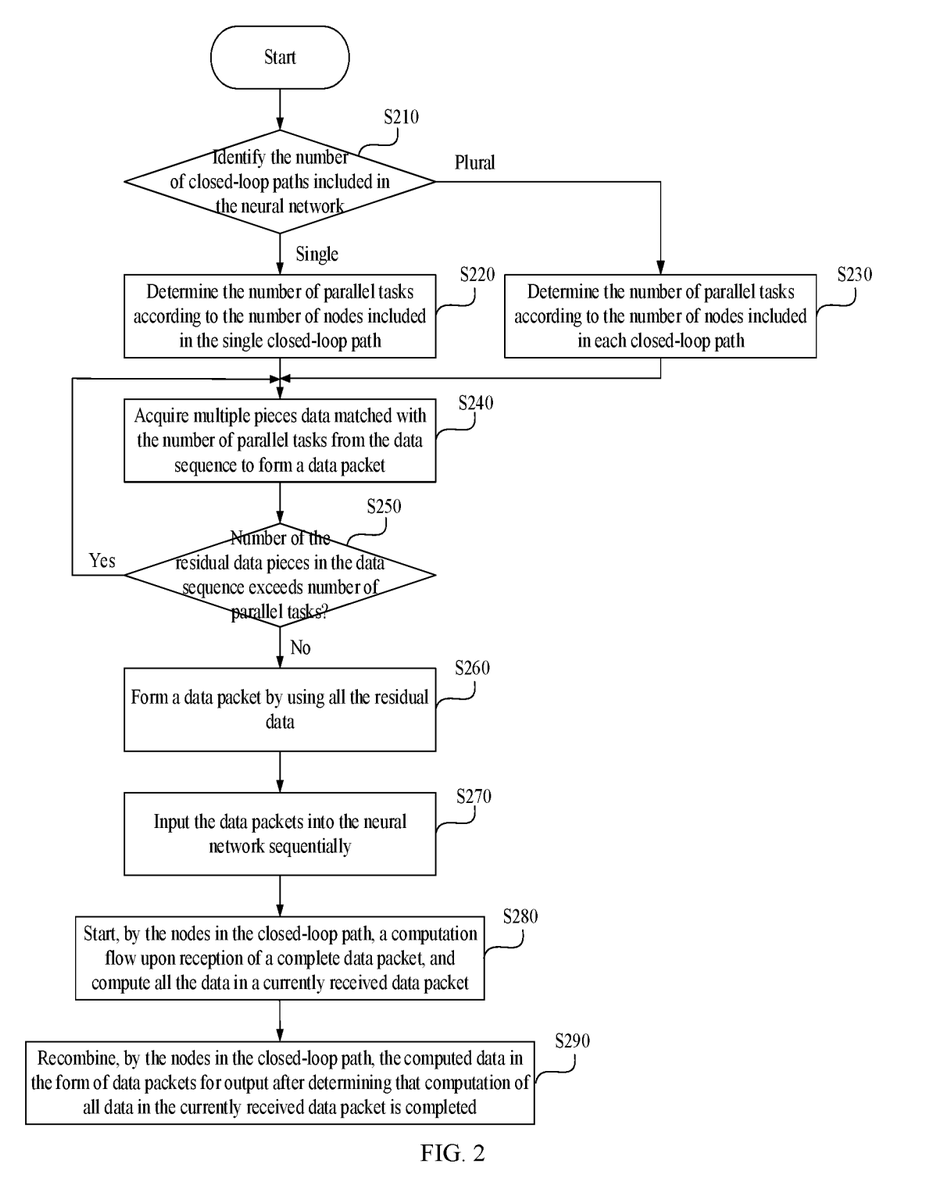
FIG. 2 is a flowchart illustrating an implementation of a multitask parallel processing method according to Embodiment II of the present disclosure.

FIG. 2 is a flowchart illustrating an implementation of a multitask parallel processing method according to Embodiment II of the present disclosure. On the basis of the above embodiments, this embodiment further refines the operation of determining the number of parallel tasks matched with the neural network according to the number of nodes included in each closed-loop path of the neural network, and the operation of generating data packets. Accordingly, the method according to the embodiment of the disclosure specifically includes the following steps S210 to S290.

At step S210, identifying the number of closed-loop paths included in the neural network: proceeding to step S220 if the neural network includes only a single closed-loop path; and proceeding to step S230 if the neural network includes a plurality of closed-loop paths.

In this embodiment, the inventor, after analyzing the structure of the neural network including the closed-loop paths, finds that the reasonable number of parallel tasks is related to both the number of closed-loop paths included in the neural network and nodes included in each closed-loop path. Therefore, the number of closed-loop paths included in the neural network may be firstly identified, and then the number of parallel tasks may be determined by adopting different strategies according to different numbers of closed-loop paths.

At step S220, determining the number of parallel tasks according to the number of nodes included in the single closed-loop path, and then proceeding to step S240.

The number of parallel tasks is less than or equal to the number of nodes.

Apparently, it will be appreciated that the number of parallel tasks cannot be 1; otherwise, the data packet will not include multiple pieces of data.

If only one closed-loop path is included in the neural network, the number of parallel tasks may be determined solely according to the number of nodes included in the closed-loop path.

Specifically, the number of parallel tasks may be determined to be any integer less than or equal to the number of nodes. For example, if 4 nodes are included in the closed-loop path, the number of parallel tasks may be determined to be any one of 2, 3 or 4. Apparently, it will be appreciated that the highest parallelism of the entire closed-loop path and the best computation effect are achieved when the number of parallel tasks is 4.

Specifically, as shown in FIG. 1A, the neural network includes only one closed-loop path consisting of nodes B, C, D and E. Considering that each node needs to process data in a time slice, data x4, processed at node A, and e0, obtained from x0 after being processed at nodes A, B, C, D and E respectively, need to be input into node B for joint computation. Therefore, the number of parallel tasks cannot be greater than 4, i.e., the number of nodes included in the closed-loop path. That is, if x4 is included in the first data packet, an error will occur in the neural computation for x4. Based on the above constraint condition and in order to further improve the parallelism, an upper limit value, that is, the number of nodes included in the single closed-loop path, may be determined as the number of parallel tasks.

At step S230, determining the number of parallel tasks according to the number of nodes included in each closed-loop path, and then proceeding to step S240.

If a plurality of closed-loop paths are included in the neural network, the number of nodes included in each closed-loop path may be computed first, according to which a reasonable number of parallel tasks may be determined.

In an optional implementation of the embodiment, the minimum number of nodes among the numbers of nodes corresponding to the plurality of closed-loop paths may be determined as the number of parallel tasks.

As described above, the number of parallel tasks in a neural network should be a fixed value, and in order to ensure the accuracy of computation, the number of parallel tasks should not exceed the number of nodes included in any closed-loop path. Therefore, in order to ensure the maximum parallelism, or computation efficiency, the minimum number of nodes may be determined as the number of parallel tasks.

In a specific example, if the neural network includes two closed-loop paths, i.e., a closed-loop path 1 including 4 nodes, and a closed-loop path 2 including 8 nodes, then the number of parallel tasks may be determine to 4.

In another optional implementation of the embodiment, a greatest common divisor of the numbers of nodes corresponding to the plurality of closed-loop paths may be determined as the number of parallel tasks.

As described above, if the minimum number of nodes among the numbers of nodes corresponding to the plurality of closed-loop paths is determined as the number of parallel tasks, a situation may occur that the number of nodes of a certain closed-loop path is not an integer multiple of the number of parallel tasks. For example, in a neural network including two closed-loop paths, one closed-loop path includes 6 nodes, while the other includes 8 nodes. When 6 is selected as the number of parallel tasks, 8 is not an integer multiple of 6, and at this time, the problems lie in that: in the process of inputting data into the closed-loop path including 8 nodes taking 6 pieces of data as a data packet, for the second data packet, the first two pieces of data (corresponding to input data x6 and x7) are directly computed without feedback from the subsequent nodes, while the subsequent 4 pieces of data (corresponding to input data x8, x9, x10 and x11) require computation result data (corresponding to the original input data x0, x1, x2 and x3) fed back from the subsequent nodes. Thus, complexity of the computation process for the above data packets is increased to some extent.

Based on this, the inventor proposes another new method to compute the number of parallel tasks, in which a greatest common divisor of the numbers of nodes corresponding to the plurality of closed-loop paths may be determined as the number of parallel tasks. At this time, the number of nodes included in each closed-loop path of the node is an integer multiple of the number of parallel tasks, and for a data packet taking the number of parallel tasks as a unit, each data in the data packet is computed in a uniform and regular manner, and when a data packet fed back from a postorder node is received, the same type of computation may be performed on each piece of data in the data packet.

However, it will be appreciated that for a plurality of closed-loop paths, the greatest common divisor is generally less than or equal to the minimum number of nodes, and in order to comprehensively measure the computation parallelism and complexity, the greatest common divisor of the numbers of nodes corresponding to the plurality of closed-loop paths, as well as the minimum number of nodes among the numbers of nodes respectively corresponding to the plurality of closed-loop paths, may be firstly acquired. If a difference between the two values is less than or equal to a preset number threshold, such as 2 or 3, the greatest common divisor may be determined as the number of parallel tasks; and if the difference between the two values is greater than the preset number threshold, the minimum number of nodes may be determined as the number of parallel tasks.

Apparently, it will be appreciated that the greatest common divisor cannot be considered as the number of parallel tasks when it equals to 1; otherwise, the data packet will not include multiple pieces of data.

Further, the inventor finds through research that when the number of nodes in a certain closed-loop path is not an integral multiple of the number of parallel tasks, the computation complexity will not significantly increase by performing the computation in a data splitting manner. Therefore, the minimum number of nodes among the numbers of nodes corresponding to the plurality of closed-loop paths may be directly determined as the number of parallel tasks.

At step S240, acquiring multiple pieces of data matched with the number of parallel tasks from the data sequence to form a data packet.

At step S250, judging whether the number of the residual data pieces in the data sequence exceeds the number of parallel tasks: if yes, returning to step S240; otherwise, proceeding to step S260.

At step S260, forming a data packet by using all the residual data.

In this embodiment, if the data sequence cannot divide the number of parallel tasks exactly, the remainder may be taken as the last data packet.

At step S270, inputting the data packets into the neural network sequentially, the data packet including multiple pieces of data.

At step S280, starting, by the nodes in the closed-loop path, a computation flow upon reception of a complete data packet, and computing all the data in a currently received data packet.

At step S290, recombining, by the nodes in the closed-loop path, the computed data in the form of data packets for output after determining that computation of all data in the currently received data packet is completed.

The neural network mainly includes two types of nodes. One type does not receive computation result data fed back by a postorder node, so this type of nodes can start a computation flow immediately after a data packet is received, so as to compute each piece of data in the data packet. The other type receives the computation result data fed back by a postorder node, so after receiving a data packet, this type of node needs to firstly judge whether the computation result data to be computed jointly is received, and the computation flow is started only when it is determined that the data packet is received, so as to compute each piece of data in the received data packet, and save the time consumed by computation preparations when the computation is started.

According to the technical solution provided in the embodiments of the present disclosure, by identifying the number of closed-loop paths included in the neural network, determining, if the neural network includes a single closed-loop path, the number of parallel tasks according to the number of nodes included in the single closed-loop path; and determining, if the neural network includes a plurality of closed-loop paths, the minimum number of nodes among the numbers of nodes respectively corresponding to the plurality of closed-loop paths or the greatest common divisor of the numbers of nodes respectively corresponding to the plurality of closed-loop paths as the number of parallel tasks, the optimal number of parallel tasks is designed for the closed-loop paths of different neural networks on the basis of considering both the parallelism and the computation complexity, thereby further improving the processing efficiency at each node in the closed-loop path of the neural network as well as the operation speed of the neural network.

Embodiment III

Figure 3:
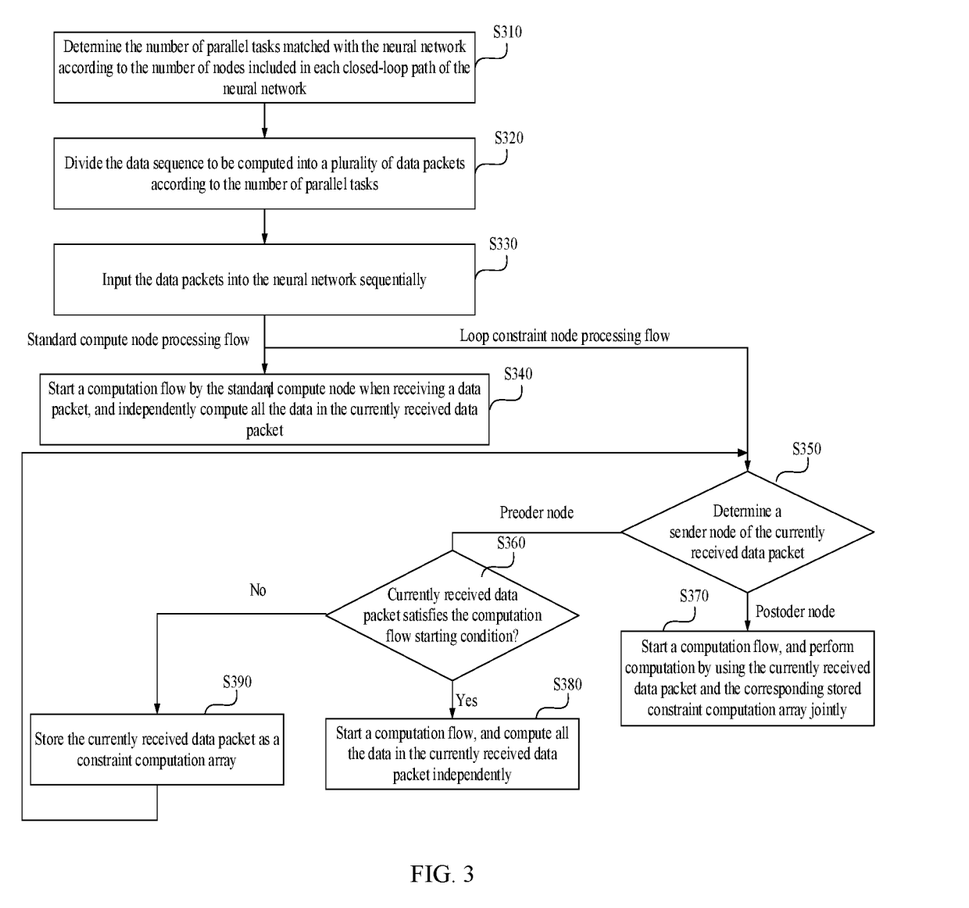
FIG. 3 is a flowchart illustrating an implementation of a multitask parallel processing method according to Embodiment III of the present disclosure.

FIG. 3 is a flowchart illustrating an implementation of a multitask parallel processing method according to Embodiment III of the present disclosure. In this embodiment, the process of parallel operation executed at each node in a closed-loop path is further refined.

Accordingly, the method according to the embodiment of the disclosure specifically includes the following steps S310 to S390.

At step S310, determining the number of parallel tasks matched with the neural network according to the number of nodes included in each closed-loop path of the neural network.

At step S320, dividing the data sequence to be computed into a plurality of data packets according to the number of parallel tasks.

At step S330, inputting the data packets into the neural network sequentially: proceeding to step S340 when a data packet is input into a standard compute node; and proceeding to step S350 when a data packet is input into a loop constraint node.

In this embodiment, the data packet includes multiple pieces of data, and the nodes in the neural network include a standard compute node and a loop constraint node.

The standard compute node, such as nodes A, C, D, E and F shown in FIG. 1A, specifically refer to a node that does not receive computation result data fed back by a postorder node. This type of nodes can start a computation flow immediately after a data packet is received, so as to compute each piece of data in the data packet independently.

The loop constraint node, such as node B shown in FIG. 1A, specifically refers to a node that receives computation result data fed back by a postorder node (so the loop constraint node is necessarily a node in a closed-loop path). After receiving a data packet, this type of node needs to firstly judge whether the computation result data to be computed jointly is received, and the computation flow is started only when it is determined that the data packet is received. Therefore, it is necessary to distinguish between different types of nodes.

At step S340, starting, by the standard compute node, a computation flow when receiving a data packet, and independently computing all the data in a currently received data packet.

When receiving a data packet, the standard compute node may start a computation flow immediately so that each piece of data in the data packet is computed, and a corresponding computing result is obtained and then output.

Specifically, as shown in FIG. 1A, after receiving a data packet $\{x0, x1, x2, x3\}$, node A may start a computation flow immediately, and, after the computation preparations, process x0, x1, x2 and x3 to obtain a0, a1, a2 and a3 to package the above contents into a new data packet $\{a0, a1, a2, a3\}$ that is output to node B as a whole.

At step S350, determining, by the loop constraint node, a sender node of the currently received data packet upon reception of a complete data packet: proceeding to step S360 if the sender node is a preorder node; and proceeding to step S370 if the sender node is a postorder node.

As described above, if a loop constraint node receives a data packet, it needs to determine whether the data packet can be immediately computed; if the received data packet sent from a preorder node does not need to wait for computation result data fed back by a postorder node, a computation flow can be started immediately; if the received data packet sent from the preorder node needs to wait for computation result data fed back by the postorder node, it needs to first store the received data packet, and then continue the waiting process; and if the received data packet is the computation result data fed back by the postorder node, a computation flow can be started immediately, and the computation result data fed back by the postorder node and the previously stored data packet sent from the preorder node are used for joint computation.

Thus, the loop constraint node, upon receiving a data packet, needs to first determine whether the data packet is specifically sent from the preorder node or the postorder node.

If the data packet is sent from the postorder node, a computation flow can be started immediately, and computation is performed by using the currently received data packet and the corresponding stored constraint computation array jointly. If the data packet is sent from the preorder node, the determination process shall continue.

At step S360, judging whether the currently received data packet satisfies a computation flow starting condition: if yes, proceeding to step S380; otherwise, proceeding to step S390.

Specifically, the step of judging whether the currently received data packet satisfies the computation flow starting condition may be implemented by: judging, by the loop constraint node, whether the currently received data packet corresponds to an unconstrained data packet in the data sequence: if yes, determining that the data packet satisfies the computation flow starting condition; otherwise, determining that the data packet does not satisfy the computation flow starting condition.

The unconstrained data packet refers to a data packet in which all data is unconstrained data.

Further, unconstrained data refers to data from the preorder node that can be processed independently.

Accordingly, constraint data refers to data from the preorder node that needs to be processed together with the computation result data fed back from the postorder node.

The data packets from the preorder node, in which at least part of the data is constraint data, are called a constraint computation array.

In this embodiment, if the data packet received by the loop constraint node corresponds to an unconstrained data packet in the data sequence, the computation flow can be started directly without waiting, i.e., it is determined that the data packet satisfies the computation flow starting condition.

Specifically, the unconstrained data packet refers to the first N data packets in a data sequence, where N is greater than or equal to 1. The specific value of N depends on the relationship between the number of nodes in the closed-loop path where the loop constraint node is located and the number of parallel tasks.

If the number of nodes in the closed-loop path where the loop constraint node is located is an integral multiple of the number of parallel tasks, the integral multiple value is N, and if the number of nodes in the closed-loop path where the loop constraint node is located is not an integral multiple of the number of parallel tasks, an integer part value of a quotient obtained by dividing the number of nodes by the number of parallel tasks is taken as N.

For example, if the number of parallel tasks in the neural network is 4, and the number of nodes in the closed-loop path where a loop constraint node is located is 8, then the 9th pieces of data input into the closed-loop path needs to be jointly computed with the computation result data fed back for the first input piece of data in the closed-loop path. Therefore, for the loop constraint node, the first two data packets in the data sequence are both unconstrained data packets.

At step S370, starting a computation flow, and performing computation by using the currently received data packet and the corresponding stored constraint computation array jointly.

Specifically, the step of performing computation by using the currently received data packet and the corresponding stored constraint computation array jointly may include: computing jointly, by the loop constraint node, all data in the currently received data packet and the corresponding data in the stored constraint computation array respectively when determining that the currently received data packet is in one-to-one correspondence with the corresponding stored constraint computation array.

If the number of nodes in the closed-loop path where the loop constraint node is located is an integral multiple of the number of parallel tasks, the loop constraint node, each time receiving a data packet sent from the postorder node, should have already received the data packets sent from the preorder node in one-to-one correspondence with each piece of data in the data packet.

In a specific example, if the number of parallel tasks in the neural network is 4, and the number of nodes in the closed-loop path where a loop constraint node is located is 4, then when a loop constraint node receives a data packet {e0, e1, e2, e3} computed for a first data packet {x0, x1, x2, x3} in the data sequence fed back from a postorder node, it may be known that data of the above data packet is in one-to-one correspondence with data of the stored data packet {a4, a5, a6, a7} computed for a second data packet {x4, x5, x6, x7} of the data sequence transmitted from a preorder node. Further, the data in the above two data packets may be directly used for the joint computation. That is, e0 is computed jointly with a4, e1 is computed jointly with a5, e2 is computed jointly with a6, and e3 is computed jointly with a7.

Specifically, the step of performing computation by using the currently received data packet and the corresponding stored constraint computation array jointly may further include: extracting, by the loop constraint node, K-M pieces of data (apparently in sequence) from the currently received data packet when it is determined that the stored constraint computation array includes M (first M) pieces of unconstrained data, where K is the number of parallel tasks; computing independently, by the loop constraint node, the M pieces of unconstrained data in the corresponding stored constraint computation array; performing, by the loop constraint node, computation by using the remaining K-M pieces (last K-M pieces) of data in the stored constraint computation array and the K-M pieces (first K-M pieces) of data extracted from the currently received data packet jointly; and storing, by the loop constraint node, the remaining M pieces (last M pieces) of data in the currently received data packet as residual processing data.

In a specific example, if the number of parallel tasks in the neural network is 4, and the number of nodes in the closed-loop path where a loop constraint node is located is 7, then when the loop constraint node receives a data packet {h0, h1, h2, h3} computed for a first data packet {x0, x1, x2, x3} in the data sequence fed back from a postorder node, it may be known that the above data packet corresponds to the stored data packet {a4, a5, a6, a7} computed for a second data packet {x4, x5, x6, x7} of the data sequence transmitted from a preorder node. However, a4, a5 and a6 therein are unconstrained data that do not need to be computed jointly with the computation result data fed back from the postorder node. Therefore, h0 needs to be extracted from the currently received {h0, h1, h2 and h3}, then a4, a5 and a6 are computed independently, while h0 and a7 are used for joint computation, and h1, h2 and h3 are stored as residual processing data.

Further, by the loop constraint node, K-M pieces of data are extracted from the currently received data packet when M pieces of residual processing data are currently present, to form a temporary data packet with the M pieces of residual processing data; and the remaining M pieces of data in the currently received data packet are stored as new residual processing data.

The loop constraint node performs computation by using the temporary data packet and the corresponding stored constraint computation array jointly.

As in the previous example, if the number of parallel tasks in the neural network is 4, and the number of nodes in the closed-loop path where a loop constraint node is located is 7, then when the loop constraint node receives a data packet {h4, h5, h6, h7} computed for a second data packet {x4, x5, x6, x7} in the data sequence fed back from a postorder node, upon determining that three pieces of residual processing data h1, h2 and h3 are currently present, h1, h2 and h3 may be combined with h4 in {h4, h5, h6, h7} to obtain a temporary data packet {h1, h2, h3, h4}, which is then computed jointly with the stored data packet {a8, a9, a10, a11} computed for a third data packet {x8, x9, x10, x11} of the data sequence transmitted from a preorder node. That is, h1 is computed jointly with a8, h2 is computed jointly with a9, h3 is computed jointly with a10, and h4 is computed jointly with a11. Meanwhile, h5, h6 and h7 are stored as new residual processing data.

M may be greater than or equal to 1 and less than K. That is, when some, but not all, of the data in the constraint computation array is unconstrained data, the above operations may be performed.

Alternatively, M may be considered to be 0. That is, when there is no unconstrained data in the constraint computation array, the above operations may be considered to be performed on "0" pieces of unconstrained data.

At step S380, starting a computation flow, and computing all the data in the currently received data packet independently.

At step S390, storing the currently received data packet as a constraint computation array, and returning to step S350.

According to the technical solution provided in the embodiments of the present disclosure, by providing different parallel processing modes for different types of nodes, the processing efficiency at each node in the closed-loop path of the neural network as well as the operation speed of the neural network may be further improved.

Embodiment IV

Figure 4:
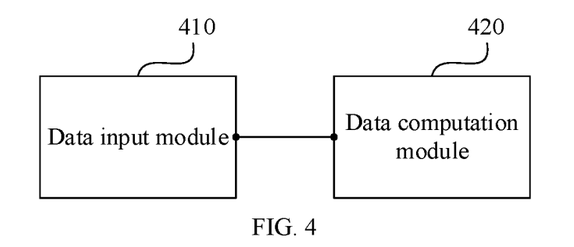
FIG. 4 is a block diagram of a multitask parallel processing apparatus according to Embodiment IV of the present disclosure.

FIG. 4 is a block diagram of a multitask parallel processing apparatus according to Embodiment IV of the present disclosure, which is applied to a neural network consisting of a plurality of nodes, the neural network including at least one closed-loop path. As shown in FIG. 4, the multitask parallel processing apparatus includes: a data input module 410 and a data computation module 420.

The data input module 410 is configured to input a data sequence to be computed into the neural network in a form of data packets, each of the data packets including multiple pieces of data.

The data computing module 420 is configured to compute, by the nodes in the closed-loop path, all the data in a currently received data packet each time a computation flow is started.

According to the technical solution provided in the embodiments of the present disclosure, a parallel task processing mechanism is introduced into the neural network including at least one closed-loop path, and by inputting the data sequence to be computed into the neural network in the form of data packets, the nodes included in the closed-loop path can compute all the data in the currently received data packet each time a computation flow is started, thereby avoiding the problems of low processing efficiency at each node, and prolonged data processing of the whole neural network when a single-task computation mode is adopted for the closed-loop path in the neural network in the related art, and improving the processing efficiency at each node in the closed-loop path of the neural network as well as the operation speed of the neural network.

On the basis of the above embodiments, the apparatus may further include: a parallel task number determining module configured to determine the number of parallel tasks in the closed-loop path before the data sequence to be computed is input into the neural network in the form of data packets.

Accordingly, the data input module 410 may be specifically configured to: input the data sequence to be computed into the neural network in the form of data packets according to the number of parallel tasks, where the number of data pieces in the data packet is the same as the number of parallel tasks.

On the basis of the above embodiments, the parallel task number determining module may be specifically configured to: determine the number of parallel tasks according to the number of nodes included in each closed-loop path of the neural network.

On the basis of the above embodiments, the parallel task number determining module may be further specifically configured to: determine, if the neural network includes a single closed-loop path, the number of parallel tasks according to the number of nodes included in the single closed-loop path, where the number of parallel tasks is less than or equal to the number of nodes.

On the basis of the above embodiments, the parallel task number determining module may be further specifically configured to: determine, if the neural network includes a plurality of closed-loop paths, the minimum number of nodes among the numbers of nodes respectively corresponding to the plurality of closed-loop paths as the number of parallel tasks.

On the basis of the above embodiments, the parallel task number determining module may be further specifically configured to: determine, if the neural network includes a plurality of closed-loop paths, the greatest common divisor of the numbers of nodes respectively corresponding to the plurality of closed-loop paths as the number of parallel tasks.

On the basis of the above embodiments, the data input module 410 may be specifically configured to: divide the data sequence to be computed into a plurality of data packets according to the number of parallel tasks, and input each data packet into the neural network; or acquire, each time a data input condition is satisfied, multiple pieces of data matched with the number of parallel tasks from the data sequence to be computed to form a data packet, and input the data packet into the neural network.

On the basis of the above embodiments, the data computing module 420 may specifically include: a first computation unit configured to start, by the nodes in the closed-loop path, a computation flow upon reception of a complete data packet, and compute all the data in the currently received data packet; and a first output unit configured to recombine, by the nodes in the closed-loop path, the computed data in the form of data packets for output after determining that computation of all data in the currently received data packet is completed.

On the basis of the above embodiments, the data computing module 420 may specifically include: a second computation unit configured to start, by the nodes in the closed-loop path, a computation flow upon reception of a first piece of data in a data packet, and compute the respective pieces of data in the data packet that are received successively; and a second output unit configured to output, by the nodes in the closed-loop path, the computed data each time at least one piece of data in the data packet is computed, where the computed at least one piece of data includes a number of data pieces less than that in the data packet.

On the basis of the above embodiments, the nodes in the closed-loop path include a loop constraint node, and the first computation unit may specifically include: a sender node determination subunit configured to determine, by the loop constraint node, a sender node of the currently received data packet upon reception of a complete data packet; a computation flow starting condition judgement subunit configured to judge, by the loop constraint node, whether the currently received data packet satisfies a computation flow starting condition if the sender node is a preorder node; an independent computation subunit configured to start, by the loop constraint node, a computation flow if the computation flow starting condition is satisfied, and compute all the data in the currently received data packet independently; a return execution subunit configured to store, by the loop constraint node, the currently received data packet as a constraint computation array if the computation flow starting condition is not satisfied, and return to the operation of determining, by the loop constraint node, a sender node of the currently received data packet upon reception of a complete data packet; and a joint computation subunit configured to start, by the loop constraint node, a computation flow if the sender node is a postorder node, and perform computation by using the currently received data packet and the corresponding stored constraint computation array jointly.

On the basis of the above embodiments, the computation flow starting condition judgement subunit may be specifically configured to: judge, by the loop constraint node, whether the currently received data packet corresponds to an unconstrained data packet in the data sequence; determine, by the loop constraint node, that the data packet satisfies the computation flow starting condition if the data packet corresponds to an unconstrained data packet in the data sequence; and determine, by the loop constraint node, that the data packet does not satisfy the computation flow starting condition if the data packet does not correspond to an unconstrained data packet in the data sequence.

On the basis of the above embodiments, the computation flow starting condition judgement subunit may be further specifically configured to: compute, by the loop constraint node, an integer part value N of a quotient obtained by dividing the number of nodes in the closed-loop path where the loop constraint node is located by the number of parallel tasks; determine, by the loop constraint node, that the currently received data packet corresponds to an unconstrained data packet in the data sequence if the currently received data packet corresponds to first N data packets in the data sequence; and determine, by the loop constraint node, that the currently received data packet does not correspond to an unconstrained data packet in the data sequence if the currently received data packet does not correspond to the first N data packets in the data sequence.

On the basis of the above embodiments, the joint computation subunit may be specifically configured to: extract, by the loop constraint node, K-M pieces of data from the currently received data packet when it is determined that the stored constraint computation array includes M pieces of unconstrained data, where K is the number of parallel tasks; compute independently, by the loop constraint node, the M pieces of unconstrained data in the corresponding stored constraint computation array; perform, by the loop constraint node, computation by using the remaining K-M pieces of data in the stored constraint computation array and the K-M pieces of data extracted from the currently received data packet jointly; and store, by the loop constraint node, the remaining M pieces of data in the currently received data packet as residual processing data.

On the basis of the above embodiments, the joint computation subunit may be further specifically configured to: extract, by the loop constraint node, K-M pieces of data from the currently received data packet when M pieces of residual processing data are currently present, to form a temporary data packet with the M pieces of residual processing data, and store the remaining M pieces of data in the currently received data packet as new residual processing data; and perform, by the loop constraint node, computation by using the temporary data packet and the corresponding stored constraint computation array jointly.

The multitask parallel processing apparatus provided in the embodiments of the disclosure can execute the multitask parallel processing method provided in any embodiment of the disclosure, and has corresponding functional modules and beneficial effects of the executed method.

Embodiment V

Figure 5:
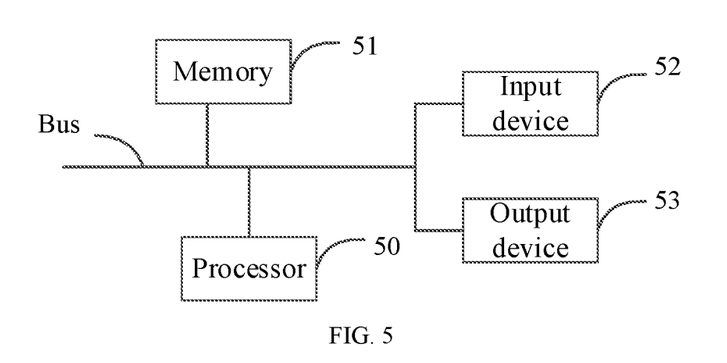
FIG. 5 is a block diagram of a computer device according to Embodiment V of the present disclosure.

FIG. 5 is a schematic structural diagram of a computer device provided in Embodiment V of the present disclosure. As shown in FIG. 5, the computer device includes a processor 50 and a memory (also called memory device) 51.

On the basis of the above embodiments, the device may further include an input device 52 and an output device 53.

There may be one or more processors 50 in the computer device, and one processor 50 is taken as an example in FIG. 5. The processor 50, the memory 51, the input device 52 and the output device 53 in the computer device may be connected via a bus or other means, and the connection via a bus is taken as an example in FIG. 5.

As a computer-readable storage medium, the memory 51 may be configured to store a software program, a computer-executable program, and a module (i.e., one or more programs), such as the modules corresponding to the multitask parallel processing method provided in the embodiments of the present disclosure. The processor 50 executes the software program, instruction and module stored in the memory 51 to perform various functional applications and data processing of the computer device, i.e., to implement the multitask parallel processing method according to any embodiment of the present disclosure.

The multitask parallel processing method according to any embodiment of the present disclosure is applied to a neural network consisting of a plurality of nodes, the neural network including at least one closed-loop path, and the multitask parallel processing method including: inputting a data sequence to be computed into the neural network in a form of data packets, each of the data packets including multiple pieces of data; and computing, by the nodes in the closed-loop path, all the data in a currently received data packet each time a computation flow is started.

The memory 51 may mainly include a program storage area and a data storage area. The program storage area may store an operating system, or an application program required for at least one function; and the data storage area may store data created according to the use of the device, and the like. Further, the memory 51 may include a high speed random access memory, and may further include a non-volatile memory, such as at least one magnetic disk memory device, flash memory device, or other non-volatile solid state memory devices. In some examples, the memory 51 may further include a memory remotely disposed relative to the processor 50. Such a memory may be connected to the computer device via a network. Examples of such networks include, but are not limited to, the Internet, intranets, local area networks, mobile communication networks, and combinations thereof.

The input device 52 may be configured to receive input numeric or character information and generate key signal inputs relating to user settings and function controls of the computer device. The output device 53 may include a display device such as a display screen.

Embodiment VI

An embodiment VI of the present disclosure further provides a storage medium (computer-readable storage medium) containing computer-executable instructions, which are configured to, when executed by a processor, execute the multitask parallel processing method according to any embodiment of the present disclosure applied to a neural network consisting of a plurality of nodes, the neural network including at least one closed-loop path, and the multitask parallel processing method including: inputting a data sequence to be computed into the neural network in a form of data packets, each of the data packets including multiple pieces of data; and computing, by the nodes in the closed-loop path, all the data in a currently received data packet each time a computation flow is started.

Apparently, in the storage medium containing computer-executable instructions provided in the embodiment of the present disclosure, the computer-executable instructions are not limited to the above method operations, and may further cause the relevant operations in the method provided in any embodiment of the present disclosure to be implemented.

Through the description of the above implementations, those skilled in the art can clearly understand that the present disclosure may be implemented by means of software plus necessary general hardware. Obviously, it may also be implemented by hardware, but in most cases, the former is preferable. Based on such understanding, the essential parts of the technical solution of the present disclosure or the parts contributing to the prior art may be embodied in the form of software products. The computer software product may be stored in a computer readable storage medium, such as a computer floppy disk, a Read-Only Memory (ROM), a Random Access Memory (RAM), a Flash Memory (FLASH), a hard disk or an optical disk, and includes a plurality of instructions for causing a computer device (which may be a personal computer, a server, or a network device, etc.) to perform the methods described in various embodiments of the present disclosure.

It is to be noted that the foregoing is merely an illustration of the preferred embodiments and principles of the applied technology in the disclosure. Those skilled in the art will appreciate that the present disclosure is not limited to the particular embodiments described herein, and that various obvious changes, rearrangements and substitutions will now be apparent to those skilled in the art without departing from the scope of the disclosure. Therefore, although the present disclosure has been described in some detail by the above embodiments, the disclosure is not limited to the above embodiments, and may include other equivalent embodiments without departing from the concept of the disclosure, and the scope of the disclosure is determined by the scope of the appended claims.

What is claimed is:

1. A multitask parallel processing method, which is applied to a neural network consisting of a plurality of nodes, the neural network comprising at least one closed-loop path, and the method comprising:
   inputting a data sequence to be computed into the neural network in a form of data packets, each of the data packets comprising multiple pieces of data; and
   computing, by the nodes in the closed-loop path, all the data in a currently received data packet each time a computation flow is started,
   wherein the step of computing, by the nodes in the closed-loop path, all the data in the currently received data packet each time a computation flow is started comprises:
   starting, by the nodes in the closed-loop path, a computation flow upon reception of a first piece of data in a data packet, and computing the respective pieces of data in the data packet that are received successively; and
   outputting, by the nodes in the closed-loop path, the computed data each time at least one piece of data in the data packet is computed, wherein the computed at least one piece of data comprises a number of data pieces less than in the data packet.

2. The method according to claim 1, wherein before the step of inputting the data sequence to be computed into the neural network in the form of data packets, the method further comprises:
   determining the number of parallel tasks in the closed-loop path; and
   the step of inputting the data sequence to be computed into the neural network in the form of data packets comprises:
   inputting the data sequence to be computed into the neural network in the form of data packets according to the number of parallel tasks, wherein the number of data pieces in the data packet is the same as the number of parallel tasks.

3. The method according to claim 2, wherein the step of determining the number of parallel tasks in the closed-loop path comprises:
   determining the number of parallel tasks according to the number of nodes comprised in each closed-loop path of the neural network.

4. The method according to claim 3, wherein the step of determining the number of parallel tasks according to the number of nodes comprised in each closed-loop path of the neural network comprises:
   determining, if the neural network comprises a single closed-loop path, the number of parallel tasks according to the number of nodes comprised in the single closed-loop path, wherein the number of parallel tasks is less than or equal to the number of nodes.

5. The method according to claim 3, wherein the step of determining the number of parallel tasks according to the number of nodes comprised in each closed-loop path of the neural network comprises:
   determining, if the neural network comprises a plurality of closed-loop paths, the minimum number of nodes among the numbers of nodes respectively corresponding to the plurality of closed-loop paths as the number of parallel tasks.

6. The method according to claim 3, wherein the step of determining the number of parallel tasks according to the number of nodes comprised in each closed-loop path of the neural network comprises:
   determining, if the neural network comprises a plurality of closed-loop paths, the greatest common divisor of the numbers of nodes respectively corresponding to the plurality of closed-loop paths as the number of parallel tasks.

7. The method according to claim 2, wherein the step of inputting the data sequence to be computed into the neural network in the form of data packets according to the number of parallel tasks comprises:
   dividing the data sequence to be computed into a plurality of data packets according to the number of parallel tasks, and inputting each data packet into the neural network; or
   acquiring, each time a data input condition is satisfied, multiple pieces of data matched with the number of parallel tasks from the data sequence to be computed to form a data packet, and inputting the data packet into the neural network.

8. The method according to claim 2, wherein the step of computing, by the nodes in the closed-loop path, all the data in the currently received data packet each time a computation flow is started comprises:
   starting, by the nodes in the closed-loop path, a computation flow upon reception of a complete data packet, and computing all the data in the currently received data packet; and
   recombining, by the nodes in the closed-loop path, the computed data in the form of data packets for output after determining that computation of all data in the currently received data packet is completed.

9. The method according to claim 8, wherein the nodes in the closed-loop path comprise a loop constraint node that receives computation result data fed back from a postorder node; and the step of starting, by the nodes in the closed-loop path, a computation flow upon reception of a complete data packet, and computing all the data in the currently received data packet comprises:

determining, by the loop constraint node, a sender node of the currently received data packet upon reception of a complete data packet;

judging, by the loop constraint node, whether the currently received data packet satisfies a computation flow starting condition if the sender node is a preorder node;

starting, by the loop constraint node, a computation flow if the computation flow starting condition is satisfied, and computing all the data in the currently received data packet independently;

storing, by the loop constraint node, the currently received data packet as a constraint computation array if the computation flow starting condition is not satisfied, and returning to the step of determining, by the loop constraint node, a sender node of the currently received data packet upon reception of a complete data packet; and starting, by the loop constraint node, a computation flow if the sender node is a postorder node, and performing computation by using the currently received data packet and the corresponding stored constraint computation array jointly.

10. The method according to claim 9, wherein the step of judging, by the loop constraint node, whether the currently received data packet satisfies the computation flow starting condition comprises:

judging, by the loop constraint node, whether the currently received data packet corresponds to an unconstrained data packet in the data sequence;

determining, by the loop constraint node, that the data packet satisfies the computation flow starting condition if the data packet corresponds to an unconstrained data packet in the data sequence; and determining, by the loop constraint node, that the data packet does not satisfy the computation flow starting condition if the data packet does not correspond to an unconstrained data packet in the data sequence.

11. The method according to claim 10, wherein the step of judging, by the loop constraint node, whether the currently received data packet corresponds to an unconstrained data packet in the data sequence comprises:

computing, by the loop constraint node, an integer part value N of a quotient obtained by dividing the number of nodes in the closed-loop path where the loop constraint node is located by the number of parallel tasks;

determining, by the loop constraint node, that the currently received data packet corresponds to an unconstrained data packet in the data sequence if the currently received data packet corresponds to first N data packets in the data sequence; and determining, by the loop constraint node, that the currently received data packet does not correspond to an unconstrained data packet in the data sequence if the currently received data packet does not correspond to the first N data packets in the data sequence.

12. The method according to claim 9, wherein the step of performing, by the loop constraint node, computation by using the currently received data packet and the corresponding stored constraint computation array jointly comprises:

extracting, by the loop constraint node, K−M pieces of data from the currently received data packet when it is determined that the stored constraint computation array comprises M pieces of unconstrained data, wherein K is the number of parallel tasks;

computing independently, by the loop constraint node, the M pieces of unconstrained data in the corresponding stored constraint computation array;

performing, by the loop constraint node, computation by using the remaining K-M pieces of data in the stored constraint computation array and the K-M pieces of data extracted from the currently received data packet jointly; and storing, by the loop constraint node, the remaining M pieces of data in the currently received data packet as residual processing data.

13. The method according to claim 12, wherein the step of performing, by the loop constraint node, computation by using the currently received data packet and the corresponding stored constraint computation array jointly further comprises:

extracting, by the loop constraint node, K−M pieces of data from the currently received data packet when M pieces of residual processing data are currently present, to form a temporary data packet with the M pieces of residual processing data, and storing the remaining M pieces of data in the currently received data packet as new residual processing data; and performing, by the loop constraint node, computation by using the temporary data packet and the corresponding stored constraint computation array jointly.

14. A multitask parallel processing apparatus, which is applied to a neural network consisting of a plurality of nodes, the neural network comprising at least one closed-loop path, and the apparatus comprising:

a data input module configured to input a data sequence to be computed into the neural network in a form of data packets, each of the data packets comprising multiple pieces of data; and a data computation module configured to compute, by the nodes in the closed-loop path, all the data in a currently received data packet each time a computation flow is started, wherein the data computation module is configured to:

start, by the nodes in the closed-loop path, a computation flow upon reception of a first piece of data in a data packet, and compute the respective pieces of data in the data packet that are received successively, and output, by the nodes in the closed-loop path, the computed data each time at least one piece of data in the data packet is computed, where the computed at least one piece of data comprises a number of data pieces less than that in the data packet.

15. A computer device, comprising:

one or more processors; and a memory device configured to store one or more programs which, when executed by the one or more processors, cause the one or more processors to implement the multitask parallel processing method according to claim 1.

16. A non-transitory computer-readable storage medium having a computer program stored thereon, wherein the computer program, when executed by a processor, causes the multitask parallel processing method according to claim 1 to be implemented.

* * * * *